US011683230B1

(12) United States Patent
Cosby et al.

(10) Patent No.: US 11,683,230 B1
(45) Date of Patent: Jun. 20, 2023

(54) APPLYING A FEATURE ON DEMAND UPGRADE RESPONSIVE TO MEASURED UTILIZATION

(71) Applicant: Lenovo Global Technology (United States) Inc., Morrisville, NC (US)

(72) Inventors: David W Cosby, Raleigh, NC (US); Matthew S Henry, San Diego, CA (US); Gary D Cudak, Raleigh, NC (US); Zhipeng Gao, Wuxi (CN)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 17/710,273

(22) Filed: Mar. 31, 2022

(51) Int. Cl.
*G06F 15/177* (2006.01)
*H04L 41/0869* (2022.01)

(52) U.S. Cl.
CPC .............................. *H04L 41/0869* (2013.01)

(58) Field of Classification Search
CPC .................................................. H04L 41/0869
See application file for complete search history.

(56) References Cited

U.S. PATENT DOCUMENTS

| 2015/0207752 | A1* | 7/2015 | Birkestrand | ........ | H04L 67/1008 709/226 |
| 2017/0286517 | A1* | 10/2017 | Horowitz | ............ | G06F 11/0754 |
| 2017/0344618 | A1* | 11/2017 | Horowitz | ............ | G06F 11/2097 |

FOREIGN PATENT DOCUMENTS

| CN | 112187544 A | * | 1/2021 | ........... H04L 41/082 |
| CN | 114978584 A | * | 8/2022 | |

* cited by examiner

*Primary Examiner* — Richard G Keehn
(74) *Attorney, Agent, or Firm* — Jeffrey L. Streets; Streets Lawfirm, P.C.

(57) ABSTRACT

A method includes various operations and a computer program product causes a processor to perform various operations. The operations may include measuring a level of utilization of a field-replaceable unit in a computing system; determining, for each field-replaceable unit, a current configuration of the field-replaceable unit, wherein the current configuration of the field-replaceable unit has a first designated utilization level; and determining whether the measured level of utilization is greater than the first designated level of utilization. The operations further include identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

20 Claims, 3 Drawing Sheets

US 11,683,230 B1

APPLYING A FEATURE ON DEMAND UPGRADE RESPONSIVE TO MEASURED UTILIZATION

BACKGROUND

The present disclosure relates to systems and methods for increasing the capabilities of a computing system.

Background of the Related Art

A computing system may be designed and implemented in consideration of both capabilities that are presently required and capabilities that are expected to be needed in the near future. To accommodate both present and future demands, a computing system may have capabilities that are well beyond the capabilities that are initially needed. However, the actual requirements of the computing system may grow over time and the capabilities required at a later point in time may differ from the original forecast in both quantitative and qualitative capabilities. For example, if the company that owns or uses the computing system develops a new online service or a new internal research program using artificial intelligence, then the original computing system that may have been designed to support general business operations may not have sufficient capabilities. In another example, the same company may merely grow their workforce by 25% and find that the data storage devices are experiencing a corresponding increase in input/output operations of about 25%. In order to maintain performance of the computing system, it may be necessary to expand the capabilities of the system from time to time.

BRIEF SUMMARY

Some embodiments provide a computer program product comprising a non-volatile computer readable medium and non-transitory program instructions embodied therein, the program instructions being configured to be executable by a processor to cause the processor to perform various operations. The operations comprise measuring a level of utilization of a field-replaceable unit in a computing system; determining, for each field-replaceable unit, a current configuration of the field-replaceable unit, wherein the current configuration of the field-replaceable unit has a first designated utilization level; and determining whether the measured level of utilization is greater than the first designated level of utilization. The operations further comprise identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

Some embodiments provide a method comprising various operations. The operations comprise measuring a level of utilization of a field-replaceable unit in a computing system; determining, for each field-replaceable unit, a current configuration of the field-replaceable unit, wherein the current configuration of the field-replaceable unit has a first designated utilization level; and determining whether the measured level of utilization is greater than the first designated level of utilization. The operations further comprise identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

DETAILED DESCRIPTION

Figure 1:
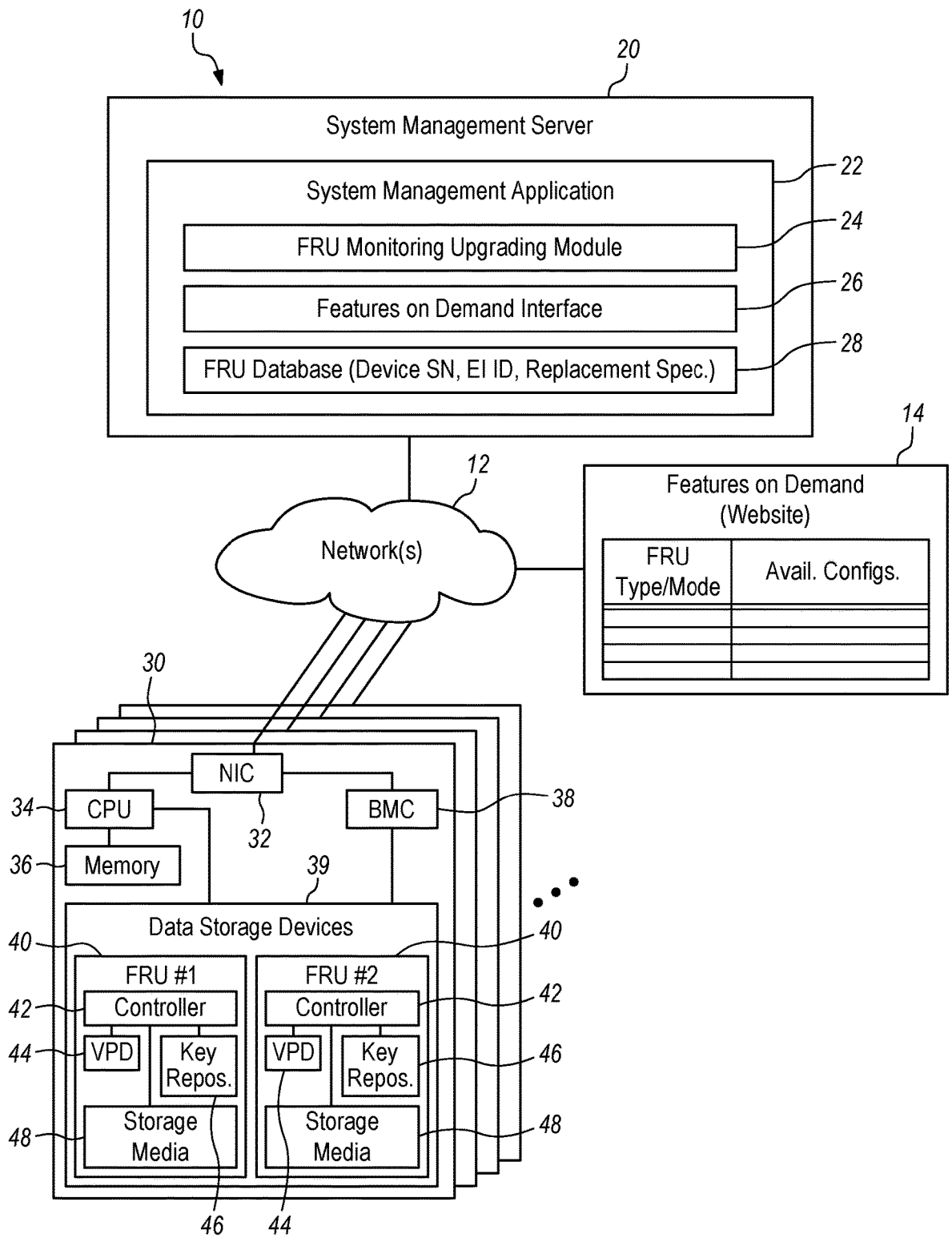
FIG. 1 is a diagram of a computing system according to some embodiments.

Some embodiments provide a computer program product comprising a non-volatile computer readable medium and non-transitory program instructions embodied therein, the program instructions being configured to be executable by a processor to cause the processor to perform various operations. The operations comprise measuring a level of utilization of a field-replaceable unit in a computing system; determining, for each field-replaceable unit, a current configuration of the field-replaceable unit, wherein the current configuration of the field-replaceable unit has a first designated utilization level; and determining whether the measured level of utilization is greater than the first designated level of utilization. The operations further comprise identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

The computer program product may be executed by one or more processor or processor unit of a system management computer, such as a system management server. Optionally, the computer program product may form a module or component of a system management application that runs on the system management computer. The foregoing computer program product may interact with, and be supported by, other modules or components of the system management application. Generally, the system management application and its modules or components may communicate with computers and other components of the computing system, either through in-band communications or out-of-band communications. For example, the computer program product and/or the system management application may have in-band communication with operating systems or hypervisors on individual compute nodes of the computing system and/or out-of-band communication with a local management controller, such as a baseboard management controller (BMC) or LENOVO® XCLARITY® controller (XCC), on the individual compute nodes.

A field-replaceable unit (FRU) is a printed circuit board, part, or assembly that can be quickly and easily removed from a computer or other piece of electronic equipment in a computing system and can be replaced by the user or a technician without having to send the entire product or system to a repair facility. Accordingly, a computing system may have several different types of field-replaceable units and a large number of field-replaceable units of each type. Non-limiting examples of field-replaceable units include data storage devices, network adapters, switches or integrated management modules. In one specific example, the field-replaceable unit may be a solid-state drive.

A computing system may be designed and implemented in consideration of both capabilities that are presently required and capabilities that are expected to be needed in the near future. To accommodate both present and future demands, a computing system may have capabilities that are well beyond the capabilities that are initially needed. However, the actual requirements of the computing may grow over time and the capabilities required at a later point in time may differ from the original forecast in both quantitative and qualitative capabilities. Features on demand is a licensing procedure that makes it easier for an administrator of a computing system to unlock additional capabilities of the computing system as needed, such as the capabilities of a server, network adapter and/or switch. Conveniently, these capabilities may be added through activation of a software key without requiring changes to the hardware of the computing system. In other words, the features or capabilities are already present in the hardware of the switch, server, adapter or other component of the computing system, and are unlocked with their respective activation key.

In some embodiments, a current configuration of the field-replaceable unit may be determined or obtained via communication with the local management controller or operating system of a compute node where the field-replaceable unit is installed and operating. For example, the local management controller may monitor and manage the hardware components of the compute node and may read, or have access to, the current configuration of field-replaceable units in the compute node. For example, the local management controller may read the current configuration from vital product data stored on the field-replaceable unit, such as in electronically erasable programmable read-only memory (EEPROM). Accordingly, the current configuration of the field-replaceable unit may be determined or obtained via communication with the local management controller. Optionally, the current configuration and other information about the field-replaceable unit may be previously uploaded to a system database separate from the individual compute node, thereby making it possible to determine or obtain the current configuration of the field-replaceable unit from such a database even through the database may have been initially populated with data obtained from the local management controller. The first designated utilization level associated with the current configuration may also be obtained from the field-replaceable unit and/or by a predetermined association between the configuration of the field-replaceable unit and the designated utilization level. Optionally, the current configuration itself may expressly recite the designated utilization level, such as a "1 drive write per day (DWPD) configuration" reciting the designated utilization level of "1 DWPD."

The actual level of utilization of the field-replaceable unit may be measured or obtained from a controller on the field-replaceable unit. For example, a solid-state drive (SSD) may have a controller that performs various functions of the solid-state drive, such as managing input/output (write/read) operations and keeping track of a utilization level. Accordingly, the utilization level of a solid-state drive might be expressed as an amount of digital storage capacity utilized, such as in units of megabytes (MB) or terabytes (TB), or as a percentage of total storage capacity utilized.

In some embodiments, a data structure, such as a database or table, may identify available configurations for different types of field-replaceable units in the computing system. Specifically, a database may include a record for each of a plurality of field-replaceable units, each record identifying any one or more alternative configurations that are available for the field-replaceable unit. In one option, the record for each field-replaceable unit may identify any alternative configuration of the field-replaceable unit that is available by applying a feature on demand, which uses an activation key (software) to unlock capabilities of the field-replaceable unit (hardware). So, the system management application may, for any field-replaceable unit, search the data structure to identify a second configuration of the field-replaceable unit having a second designated utilization level that is greater than the measured level of utilization of the field-replaceable unit. Embodiments may therefore include identifying, in response to determining that the measured level of utilization is greater than the first designated level of utilization, a second configuration of the field-replaceable unit having a second designated utilization level that is greater than the measured level of utilization of the field-replaceable unit. The second configuration may be uniquely associated with a feature on demand.

A feature on demand upgrade may be applied to the field-replaceable unit to implement the second configuration. Applying the feature on demand upgrade to the field-replaceable unit may include storing an activation key in a key repository on the field-replaceable unit or on the compute node where the field-replaceable unit is installed. The activation keys for various features on demand may be obtained from the vendor of the field-replaceable unit or from the equipment integrator of the computing system that includes the field-replaceable unit. For example, the activation key may be automatically selected and downloaded from a website maintained by the vendor or equipment integrator prior to storing in the necessary key repository.

Some embodiments further include accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system. The availability of such a database facilitates cross-referencing the vendor-supplied serial number or other identifier with the equipment integrator's identifier assigned to the same field-replaceable unit and may provide an alternative to the equipment integrator modifying the vital product data electronically stored on the field-replaceable unit and/or the labeling physically secured to the field-replaceable unit. An equipment integrator may use their own field-replaceable unit (FRU) identifiers to form a unified and uniform replacement part tracking system for all of the devices or parts, including field-replaceable units, that they have integrated into a product or solution. Furthermore, in response to applying a second configuration to the field-replaceable unit, embodiments may update the database to identify the second configuration of the field-replaceable unit as a recommended configuration for replacing the field-replaceable unit when the field-replacement requires replacement. Alternatively, in response to applying the second configuration to the field-replaceable unit, embodiments may update the database to identify a second field-replaceable unit as a recommended replacement for the field-replaceable unit when the field-replacement requires replacement, wherein the second field-replaceable unit has a designated utilization level that is greater than the measured utilization level.

Some embodiments may further include detecting a failure of one of the field-replaceable units and reading the vendor-supplied serial number from vital product data stored on the failed field-replaceable unit. A database may then be accessed, where the database stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system. The database may then be searched for the vendor-supplied serial number that was read from the vital product data stored on the failed field-replaceable unit. A warranty for the field-replaceable unit may be validated in response to finding the vendor-supplied serial number of the failed field-replaceable unit in the database. In other words, the database may be formed by the equipment integrator on or about the time that the computing system is placed in operation and only includes records for components, including field-replaceable units, that were provided by the equipment integrator. Any field-replaceable unit that is in the computing system but not in the database must have been installed after-the-fact by the end user and would not be covered by any warranty offered by the equipment integrator.

Some embodiments may further include obtaining a vendor-supplied identifier for each of a plurality of field-replaceable units in a computing system, assigning an equipment integrator identifier to each of the field-replaceable units (FRUs) in the computing system, and storing in a database, for each of the field-replaceable units, the vendor-supplied identifier in association with the equipment integrator identifier. Accordingly, this embodiment describes the formation of the database that may be later used to cross-reference between the vendor-supplied identifier and the equipment integrator identifier for the same field-replaceable unit. In one option, the vendor-supplied identifier, such as a serial number, for each of the field-replaceable units may be obtained by reading the vital product data stored by the field-replaceable unit. In a further option, the database may be a distributed ledger that is stored in a blockchain. A blockchain is a growing list of records or "blocks" that are linked together using cryptography. For example, each block may contain a cryptographic hash of the previous block, a timestamp, and a further record or transaction.

In one example of some embodiments, the operation of a solid-state drive (SSD) is monitored to determine whether the current configuration at a 1 drive writes per day (DWPD) is appropriate. If it is determined that the operation of the computing system would improve if the SSD were configured at 3 DWPD, then embodiments may reconfigure the SSD. For example, the system management application may determine whether the SSD device vendor has restrictions on upgrading or overprovisioning, such as a vendor restriction that limits overprovisioning of the SSD to a window of time early in the life of the device. If the status of the SSD device is found to satisfy the vendor restrictions (i.e., the vendor permits the current upgrading or overprovisioning of the SSD), then the system management application may apply a feature on demand to upgrade or overprovision the SSD to achieve the configuration of 3 DWPD. Optionally, after dynamically applying a feature on demand to the FRU for the device, the unique vendor serial number may be used to facilitate charging the customer for the feature on demand and paying the vendor or equipment integrator accordingly.

In another option, the database may be updated to identify a recommended FRU that would match the actual usage characterization of the FRU better than the original FRU it would replace. Accordingly, when the original FRU requires replacement, the recommended FRU may be requested or authorized for use rather than making a direct replacement of the original FRU. However, if the SSD is not permitted to implement the upgrade or overprovisioning, then the SSD will be likely to wear out prematurely, but the database or ledger may still be updated to identify the recommended FRU or configuration so that the original FRU may be replaced with the recommended FRU or configuration.

Some embodiments provide a method, such as a computer-implemented method, comprising various operations. The operations comprise measuring a level of utilization of a field-replaceable unit in a computing system; determining, for each field-replaceable unit, a current configuration of the field-replaceable unit, wherein the current configuration of the field-replaceable unit has a first designated utilization level; and determining whether the measured level of utilization is greater than the first designated level of utilization. The operations further comprise identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

The method embodiments may further include any one or more operation or other aspect of the computer program products disclosed herein. Therefore, the foregoing description of the operations in the context of a computer program product will not be repeated here in the context of a method, such as a computer-implemented method. Similarly, embodiments may be directed to a computing system that includes a processor unit capable of performing any of the disclosed operations.

FIG. 1 is a diagram of a computing system 10 according to some embodiments. The computing system 10 includes a system management server 20, multiple compute nodes 30, and a features on demand website 14 that are each connected to one or more networks 12 that support communication therebetween. Only one compute node 30 is shown in detail, but any number of compute nodes 30 may be included in the computing system 10.

Figures 3, 4:
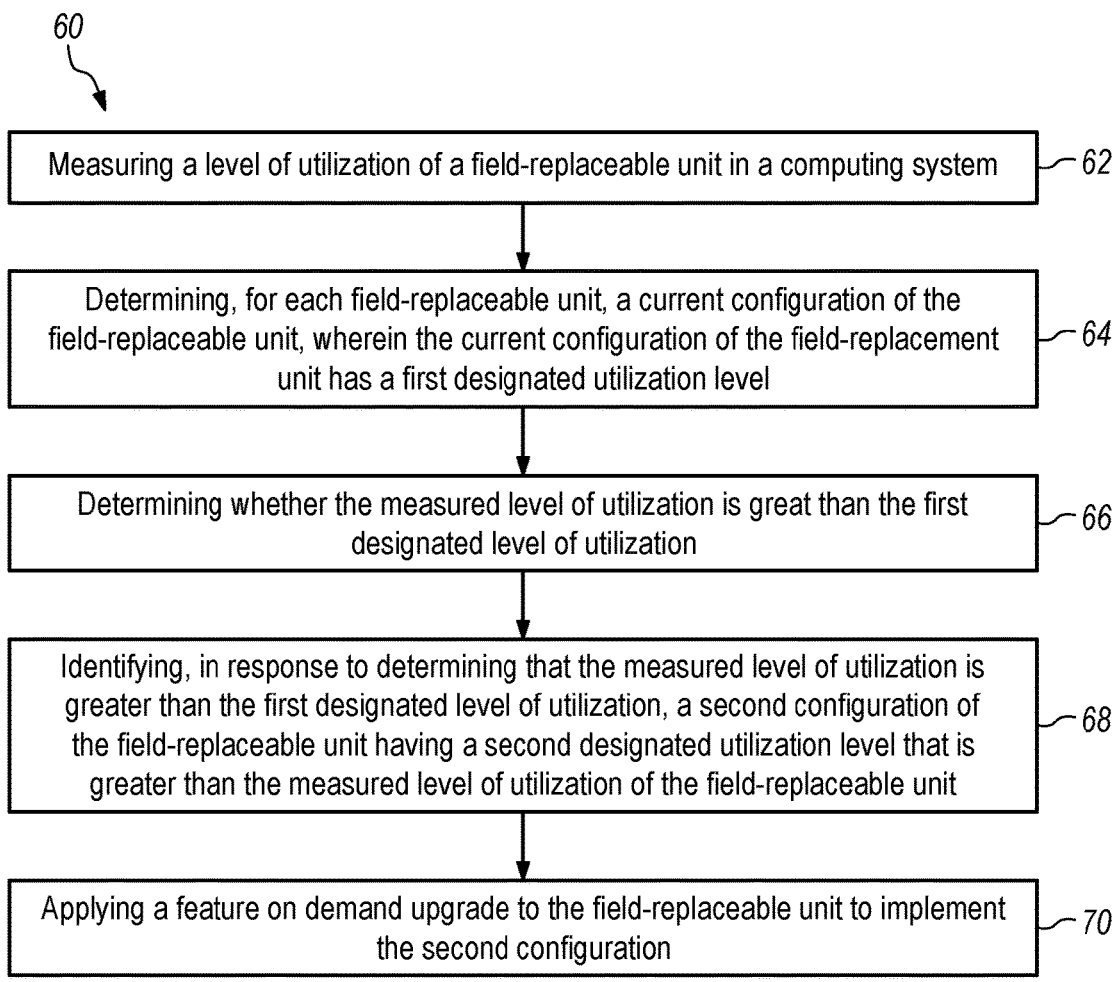
FIG. 3 is a table that is representative of a field-replaceable unit (FRU) database according to some embodiments.
FIG. 4 is a flowchart of operations according to some embodiments.

The system management server 20 includes a system management application 22 that monitors and controls ("manages") the compute nodes 30 of the computing system 10. Optionally, the system management application may communicate with each compute node 30 either in-band to the CPU 34 running the operating system of the compute node 30 or out-of-band to the baseboard management controller (BMC) 38. According to some embodiments, the system management application 22 may include a field-replaceable unit (FRU) monitoring and upgrading module 24, a features on demand interface or module 26 and an FRU database 28. The field-replaceable unit (FRU) monitoring and upgrading module 24 may include logic for monitoring the utilization level of the FRUs in the computing system 10 and determining whether to upgrade the FRU and/or store a recommended replacement FRU or FRU configuration. The features on demand interface or module 26 may include logic for interfacing with the features on demand website 14 or similar central source for features on demand, including downloading an activation key that is needed to apply the desired configuration to an FRU. The FRU database 28 may store records associating a vendor-supplied device or FRU serial number, an equipment integrator identifier, an optional recommendation of a replacement FRU or FRU configuration. An example of the FRU database 28 is illustrated in FIG. 3.

The compute node 30 includes a network interface controller 32, a central processing unit (CPU) 34 coupled to memory 36, and a baseboard management controller (BMC) 38. Both the CPU 34 and the BMC 38 may communicate with the data storage devices 39, which may include one or more field-replaceable units (FRUs). In this example, the data storage devices 39 are illustrated as including two field-replaceable units (FRU #1 and FRU #2) 40. Each FRU 40 includes a controller 42, vital product data 44 (perhaps stored in an electronically erasable programmable read-only memory (EEPROM)), a key repository 46 and storage media 48. The controller 42 of each FRU 40 has access to the vital product data 44, the key repository 46 and the storage media 48. The FRU monitoring and upgrading module may identifying the respective FRUs 40 by requesting the vital product data 44 from the controller 42 and may monitor the utilization level of the respective FRUs 40 by requesting that information from the controller 42. If a feature on demand is implemented for one of the FRUs, the corresponding activation key is applied or stored in the key repository 46.

The features on demand website 14 includes a data structure for identifying various field-replaceable units (FRUs) and any alternative configurations that are available via a feature on demand. In other words, the available configurations for any FRU are listed and identified in association with identification of the FRU, such as an FRU type. Accordingly, if the FRU monitoring and upgrading module 24 identifies a measured level of utilization of a field-replaceable unit 40 in the compute node 30 of the computing system 10 and identifies a current configuration of the field-replaceable unit 40 as having a first designated utilization level, then the module 24 may further determine whether the measured level of utilization is greater than the first designated level of utilization. In response to determining that the measured level of utilization is greater than the first designated level of utilization, the FRU monitoring and upgrading module 24 may cause the features on demand interface 26 to communicate with the features on demand website 14 to identify an available second configuration of the field-replaceable unit having a second designated utilization level that is greater than the measured level of utilization of the field-replaceable unit. The features on demand interface 26 may then download an activation key corresponding to the second designated utilization level and provide it to the FRU monitoring and upgrading module 24. The FRU monitoring and upgrading module 24 may then provide the activation key to the particular FRU 40 for the controller 42 to save in the key repository 46 of the FRU 40.

Figure 2:
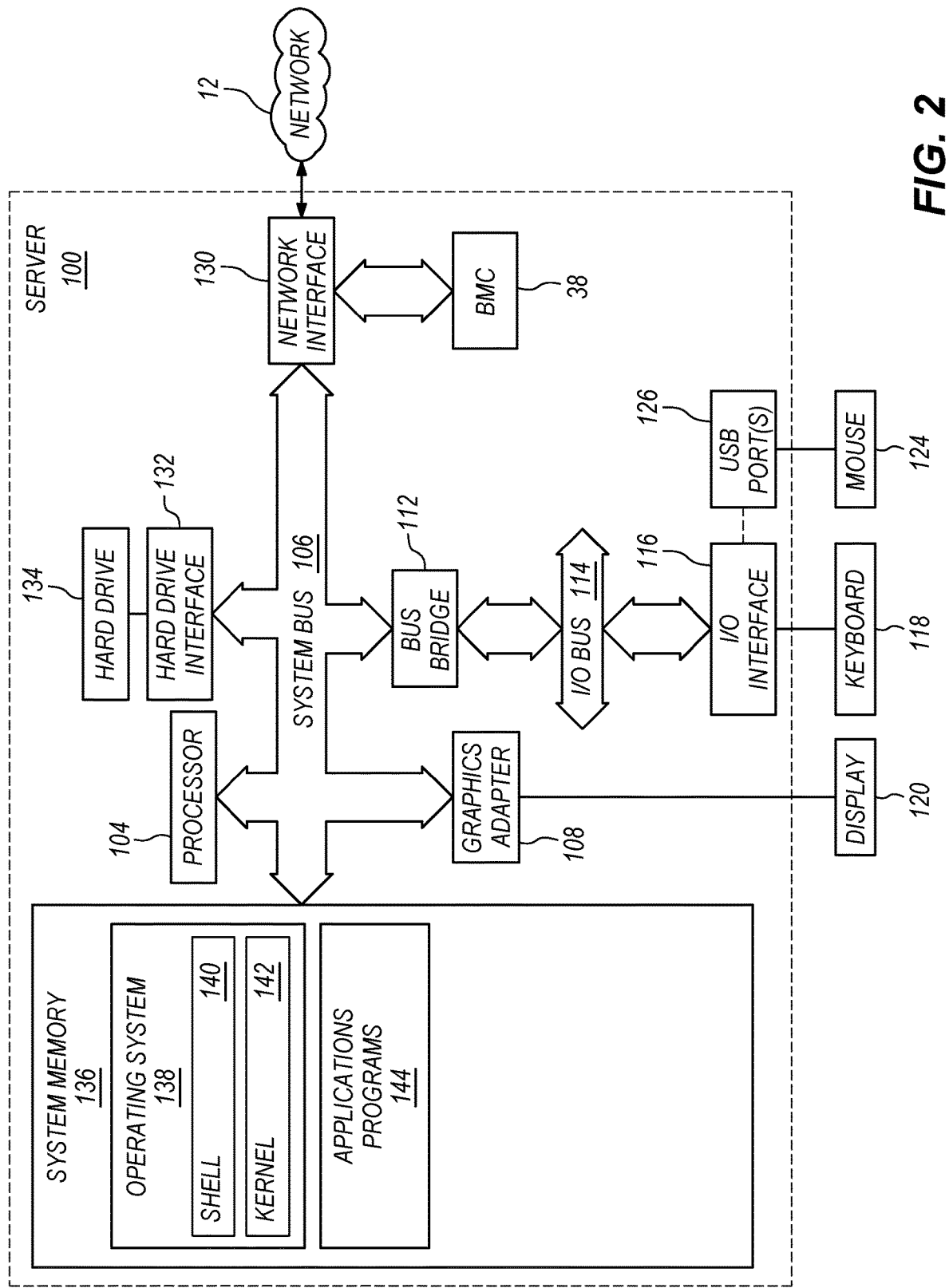
FIG. 2 is a diagram of a server according to some embodiments.

FIG. 2 is a diagram of one embodiment of a server 100 that may be representative, but not limiting, of the configuration of any one or more of the system management server 20, compute nodes or servers 30, and/or a computer that supports the features on demand website 14 of FIG. 1. The server 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, such as a keyboard 118 (perhaps as a touch screen virtual keyboard), and a USB mouse 124 via USB port(s) 126 (or other type of pointing device, such as a trackpad). As depicted, the server 100 may communicate with other devices over the network 14 using a network adapter or network interface controller 130. For example, where the server 100 represents a compute node or server 30, the server 100 may communicate with the system management server 20 over the network 12 consistent with system 10 of FIG. 1. The hardware elements depicted in the server 100 are not intended to be exhaustive, but rather are representative. For instance, the server 100 may include non-volatile memory, a field-replaceable unit and the like.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as the lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Where the server 100 implements a system management server 20, the application program may be a system management application including program instructions that cause the processor 104 to perform the operations of the system management application, including the field-replaceable unit (FRU) monitoring and upgrading module 24, a features on demand interface or module 26 and an FRU database 28 as shown in FIG. 1. Where the server 100 implements a compute node 30, the operating system 138 may be a hypervisor for supporting virtual machines.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management. As shown, the server 100 includes application programs 144 in the system memory of the server 100, which application programs may include, without limitation, a system management application.

In some embodiments, the server 100 may be representative of the hardware configuration of a managed compute node or server 30. Accordingly, the server 100 may further include a service processor, such as a baseboard management controller (BMC) 38. The BMC may be used to perform out-of-band processing and may monitor and manage various features of the hardware components of the server.

FIG. 3 is a table that is representative of a field-replaceable unit (FRU) database 28 according to some embodiments. The database 28 may represent any of a wide variety of data structures, such as a table, to associate (i.e., cross-reference) the vendor-supplied serial number (column 50) of each field-replaceable unit (FRU) in the computing system with an equipment integrator-supplied FRU tracking identifier (column 52) for the same FRU. For some embodiments, the database 28 may further include a recommended replacement FRU or FRU configuration (column 54) that should be used when the FRU requires replacement. The database 28 may optionally further include other data about the FRU, such as the FRU type (column 56), the FRU model (column 58), and/or similar information. The FRU type and model information may be helpful when looking for available configurations on the features on demand website 14. While the FRU serial number might be suitable to lookup available configurations, the FRU type and model may be also be used to identify an available configuration. In one option, the database 28 may be a distributed ledger, such as a ledger stored in a Blockchain.

The use of a database or ledger supports the equipment vendor assignment of FRU identifiers to each field-replaceable unit, but also supports recognition of device vendor serial numbers for each of the components that were sold, supported, and warranted by the equipment integrator. Since vendor-supplied serial numbers are protected and trusted core information, the use of serial number is an excellent basis for per device warranty entitlement. If the device is supported by the equipment integrator, then the device vendor serial number may be found in the ledger data in association with the equipment integrator's FRU system.

FIG. 4 is a flowchart of operations 60 according to some embodiments. Operation 62 includes measuring a level of utilization of a field-replaceable unit in a computing system. Operation 64 includes determining, for each field-replaceable unit, a current configuration of the field-replaceable unit, wherein the current configuration of the field-replaceable unit has a first designated utilization level. Operation 66 includes determining whether the measured level of utilization is greater than the first designated level of utilization. Operation 68 includes identifying, in response to determining that the measured level of utilization is greater than the first designated level of utilization, a second configuration of the field-replaceable unit having a second designated utilization level that is greater than the measured level of utilization of the field-replaceable unit. Operation 70 includes applying a feature on demand upgrade to the field-replaceable unit to implement the second configuration.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
   measuring a level of utilization of a field-replaceable unit in a computing system;
   determining, for the field-replaceable unit, a current configuration of the field-replaceable unit, wherein the current configuration of the field-replaceable unit has a first designated utilization level;
   determining whether the measured level of utilization is greater than the first designated level of utilization;
   identifying, in response to determining that the measured level of utilization is greater than the first designated level of utilization, a second configuration of the field-replaceable unit having a second designated utilization level that is greater than the measured level of utilization of the field-replaceable unit; and
   applying a feature on demand upgrade to the field-replaceable unit to implement the second configuration.

2. The computer program product of claim 1, wherein applying the feature on demand upgrade to the field-replaceable unit includes storing an activation key in a key repository on the field-replaceable unit.

3. The computer program product of claim 2, the operations further comprising:
   downloading the activation key from a website.

4. The computer program product of claim 2, wherein the field-replaceable unit is a solid-state drive.

5. The computer program product of claim 1, wherein the field-replaceable unit is a data storage device, network adapter, switch or integrated management module.

6. The computer program product of claim 1, the operations further comprising:
   accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system; and
   updating the database to identify the second configuration of the field-replaceable unit as a recommended configuration for replacing the field-replaceable unit when the field-replacement requires replacement.

7. The computer program product of claim 1, the operations further comprising:
   accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system; and
   updating the database to identify a second field-replaceable unit as a recommended replacement for the field-replaceable unit when the field-replacement requires replacement, wherein the second field-replaceable unit has a designated utilization level that is greater than the measured utilization level.

8. The computer program product of claim 1, the operations further comprising:
   accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system;
   detecting a failure of one of the field-replaceable units;
   reading the vendor-supplied serial number from vital product data stored on the failed field-replaceable unit;
   searching the database for the vendor-supplied serial number read from the vital product data stored on the failed field-replaceable unit; and
   validating a warranty for the field-replaceable unit in response to finding the vendor-supplied serial number of the failed field-replaceable unit in the database.

9. The computer program product of claim 1, the operations further comprising:

obtaining a vendor-supplied identifier for each of a plurality of field-replaceable units in a computing system;

assigning an equipment integrator identifier to each of the field-replaceable units (FRUs) in the computing system; and storing in a database, for each of the field-replaceable units, the vendor-supplied identifier in association with the equipment integrator identifier.

10. The computer program product of claim 9, wherein the vendor-supplied identifier for each of the field-replaceable units is obtained by reading the vital product data stored by the field-replaceable unit.

11. The computer program product of claim 9, wherein the vendor-supplied identifier for each of the field-replaceable units includes a serial number.

12. The computer program product of claim 9, wherein the database is a distributed ledger stored in a blockchain.

13. A method comprising:

measuring a level of utilization of a field-replaceable unit in a computing system;

determining, for the field-replaceable unit, a current configuration of the field-replaceable unit, wherein the current configuration of the field-replaceable unit has a first designated utilization level;

determining whether the measured level of utilization is greater than the first designated level of utilization;

identifying, in response to determining that the measured level of utilization is greater than the first designated level of utilization, a second configuration of the field-replaceable unit having a second designated utilization level that is greater than the measured level of utilization of the field-replaceable unit; and applying a feature on demand upgrade to the field-replaceable unit to implement the second configuration.

14. The method of claim 13, wherein applying the feature on demand upgrade to the field-replaceable unit includes storing an activation key in a key repository on the field-replaceable unit.

15. The method of claim 14, the operations further comprising:

downloading the activation key from a website.

16. The method of claim 13, wherein the field-replaceable unit is a data storage device, network adapter, switch or integrated management module.

17. The method of claim 13, the operations further comprising:

accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system; and updating the database to identify the second configuration of the field-replaceable unit as a recommended configuration for replacing the field-replaceable unit when the field-replacement requires replacement.

18. The method of claim 13, the operations further comprising:

accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system; and updating the database to identify a second field-replaceable unit as a recommended replacement for the field-replaceable unit when the field-replacement requires replacement, wherein the second field-replaceable unit has a designated utilization level that is greater than the measured utilization level.

19. The method of claim 13, the operations further comprising:

accessing a database that stores, for each of a plurality of field-replaceable units in a computing system, an association between a vendor-supplied serial number assigned to the field-replaceable unit and a field-replaceable unit identifier assigned to the field-replaceable unit by an equipment integrator that integrated the field-replaceable unit into the computing system;

detecting a failure of one of the field-replaceable units;

reading the vendor-supplied serial number from vital product data stored on the failed field-replaceable unit;

searching the database for the vendor-supplied serial number read from the vital product data stored on the failed field-replaceable unit; and validating a warranty for the field-replaceable unit in response to finding the vendor-supplied serial number of the failed field-replaceable unit in the database.

20. The method of claim 13, the operations further comprising:

obtaining a vendor-supplied identifier for each of a plurality of field-replaceable units in a computing system;

assigning an equipment integrator identifier to each of the field-replaceable units (FRUs) in the computing system; and storing in a database, for each of the field-replaceable units, the vendor-supplied identifier in association with the equipment integrator identifier.

* * * * *